(12) United States Patent
Knobloch et al.

(10) Patent No.: US 8,820,429 B2
(45) Date of Patent: Sep. 2, 2014

(54) FERTILIZER APPLICATOR WITH IN-FRAME FOLDING ACTUATOR FOR FOLDING AN OUTER FRAME MEMBER RELATIVE TO AN INNER FRAME MEMBER

(75) Inventors: Dean A. Knobloch, Goodfield, IL (US); Michael C. Hatton, Washington, IL (US); Matthew R. Sudbrink, Peoria, IL (US)

(73) Assignee: CNH Industrial America LLC, New Holland, PA (US)

( * ) Notice: Subject to any disclaimer, the term of this patent is extended or adjusted under 35 U.S.C. 154(b) by 606 days.

(21) Appl. No.: 13/075,850

(22) Filed: Mar. 30, 2011

(65) Prior Publication Data

US 2012/0247378 A1 Oct. 4, 2012

(51) Int. Cl.
*A01B 49/00* (2006.01)

(52) U.S. Cl.
USPC .............................. 172/311; 172/460; 172/471

(58) Field of Classification Search
USPC ........... 172/310, 311, 456, 460, 471; 111/120
See application file for complete search history.

(56) References Cited

U.S. PATENT DOCUMENTS

| | | | | |
|---|---|---|---|---|
| 3,774,693 A | * | 11/1973 | Orthman | 172/311 |
| 3,844,358 A | * | 10/1974 | Shuler et al. | 172/311 |
| 3,941,194 A | * | 3/1976 | Orthman | 172/311 |
| 4,023,623 A | * | 5/1977 | Anderson | 172/311 |
| 4,030,551 A | | 6/1977 | Boetto et al. | |
| 4,046,203 A | | 9/1977 | Ward | |
| 4,074,766 A | | 2/1978 | Orthman | |
| 4,098,347 A | * | 7/1978 | Honnold | 172/311 |
| 4,133,391 A | * | 1/1979 | Richardson et al. | 172/311 |
| 4,151,886 A | | 5/1979 | Boetto et al. | |
| 4,171,726 A | * | 10/1979 | Ward | 172/456 |
| 4,191,260 A | * | 3/1980 | Klindworth | 172/311 |
| 4,204,575 A | * | 5/1980 | Richardson et al. | 172/1 |
| 4,281,720 A | * | 8/1981 | Tusing | 172/776 |
| 4,336,846 A | * | 6/1982 | Boetto | 172/776 |
| 4,342,367 A | * | 8/1982 | Gates | 172/776 |
| 4,366,867 A | * | 1/1983 | Filbrun | 172/776 |
| 4,418,763 A | | 12/1983 | Boetto | |
| 4,449,590 A | * | 5/1984 | Williamson | 172/126 |
| 4,453,601 A | | 6/1984 | Orthman et al. | |
| 4,529,040 A | * | 7/1985 | Grollimund | 172/311 |
| 4,646,851 A | * | 3/1987 | Duello | 172/776 |
| 4,923,017 A | | 5/1990 | Meet et al. | |
| 5,025,866 A | * | 6/1991 | Schmidt et al. | 172/6 |
| 5,429,195 A | * | 7/1995 | Turnis | 172/311 |
| 5,485,797 A | * | 1/1996 | Green et al. | 111/200 |
| 5,573,070 A | | 11/1996 | Meek et al. | |
| 5,740,870 A | * | 4/1998 | Rodgers et al. | 172/456 |
| 6,035,942 A | | 3/2000 | Smith et al. | |
| 6,293,352 B1 | | 9/2001 | Hundeby et al. | |

(Continued)

*Primary Examiner* — Jamie L McGowan
(74) *Attorney, Agent, or Firm* — Rebecca L. Henkel

(57) ABSTRACT

A fertilizer applicator of increased operating width, e.g., sixty (60) or sixty-five (65) feet, has a carrier frame and a pair of wing sections pivotally mounted to opposite ends of the carrier frame. The wing sections include an inner wing member and an outer wing member. Each wing section includes an actuator for folding/unfolding a respective outer wing member relative to a respective inner wing member. The inner wing member includes a frame member defining an elongated cavity, and the actuator is positioned within the elongated cavity. This allows the actuator to effectively fold/unfold the outer wing member relative to the inner wing member without the physical structure of the actuator impeding movement of the outer wing member thereby allowing the outer wing member to pivot upland to a position against the inner wing member.

19 Claims, 11 Drawing Sheets

(56) References Cited

U.S. PATENT DOCUMENTS

| | | |
|---|---|---|
| 6,415,873 B1 * | 7/2002 | Hudgins ................. 172/311 |
| 6,871,709 B2 * | 3/2005 | Knobloch et al. ......... 172/145 |
| 7,497,269 B2 | 3/2009 | Jagow |
| 7,644,780 B2 | 1/2010 | Harnetiaux et al. |
| 8,342,256 B2 * | 1/2013 | Adams et al. ............ 172/311 |
| 8,505,645 B1 * | 8/2013 | Kelly et al. ............. 172/311 |
| 2005/0087350 A1 * | 4/2005 | Bauer ................... 172/311 |
| 2007/0079976 A1 * | 4/2007 | Jagow ................... 172/311 |

* cited by examiner

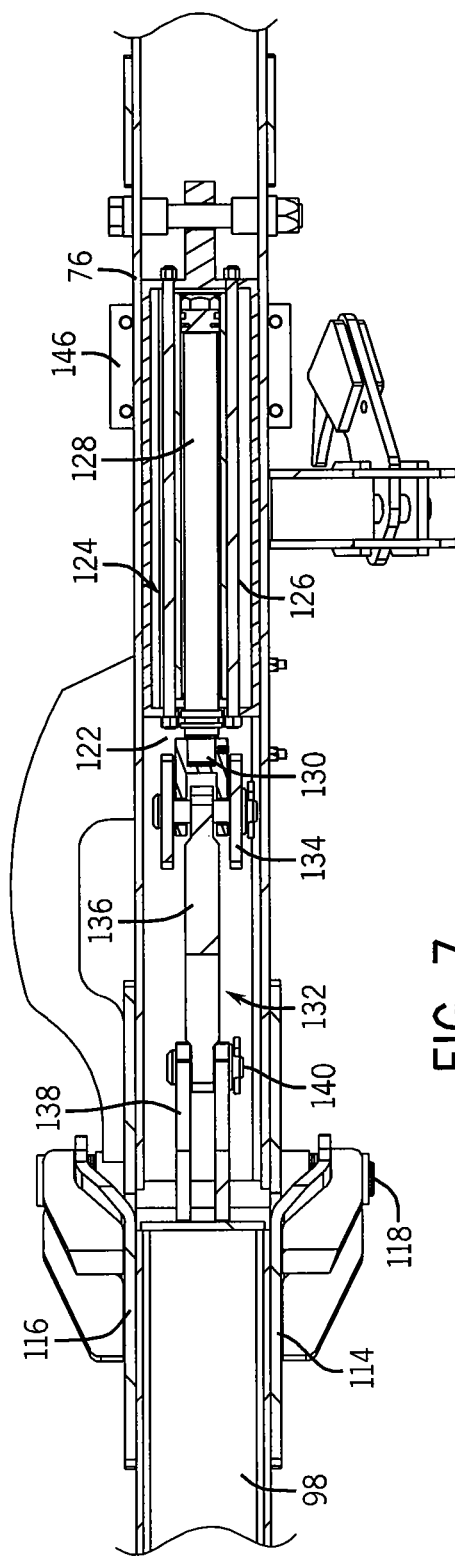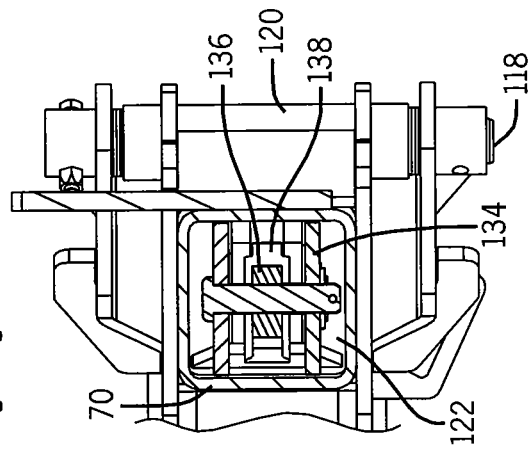
FIG. 7
FIG. 8

FERTILIZER APPLICATOR WITH IN-FRAME FOLDING ACTUATOR FOR FOLDING AN OUTER FRAME MEMBER RELATIVE TO AN INNER FRAME MEMBER

FIELD OF THE INVENTION

The present invention relates to farm implements and, more particularly, to a foldable fertilizer applicator.

BACKGROUND OF THE INVENTION

Fertilizer applicators are used to apply liquid-gaseous fertilizer, such as anhydrous ammonia, to a farm field. A conventional fertilizer applicator will consist of a carrier frame and left and right wing booms mounted to opposite sides of the carrier frame. Pivoting mechanisms are used to fold the left and right wing booms vertically, i.e., along a fore-aft dimension of the carrier frame, from an extended working position to a folded, transport position.

In an effort to increase the operational width of fertilizer applicators and thereby reduce the time required to apply the liquid-gaseous fertilizer to acreage, fertilizer applicators have been designed with the left and right wing booms, with each having an inner frame section that is pivotally mounted to the carrier frame and an outer frame section that is pivotally mounted to the inner frame section. A typical fertilizer applicator having double fold wings will have a working width between twenty-seven and fifty-two feet, and a transport width of less than twenty feet, e.g., approximately seventeen feet.

Increasing the operational width beyond fifty-two feet however has been problematic. That is, simply adding a third frame section, i.e., an outermost frame section, to each wing boom, has been found to be unworkable in achieving a desired transport width—a transport width less than twenty feet. For example, adding frame sections to the wing booms increases the number of pivot joints and the number of actuators that are required to fold and unfold the machine. The pivot joints and actuators add to the overall size of the machine, which, for example, adds to the fore-aft length of the machine when in the transport position.

Additionally, using conventional folding techniques to move the fertilizer applicator between the unfolded, working position and the folded, transport position has been found to be ineffective. For instance, folding three frame sections vertically in a manner similar to the folding of wing booms having two frame sections requires larger actuators and pivot connections capable of supporting the additional weight. Also, such a vertical folding scheme can result in an undesirable distribution of weight on the carrier frame that, if not corrected, can affect the integrity of the carrier frame-tractor connection.

Therefore, there is a need or desire for a fertilizer applicator of increased operational width yet capable of being folded into a desired transport position.

SUMMARY OF THE INVENTION

The present invention is directed to a fertilizer applicator of increased operating width, e.g., sixty (60) or sixty-five (65) feet, having a carrier frame and a pair of wing sections pivotally mounted to opposite ends of the carrier frame. The wing sections include an inner wing member and an outer wing member. Each wing section includes an actuator for folding/unfolding a respective outer wing member relative to a respective inner wing member. The inner wing member includes a frame member defining an elongated cavity, and the actuator is positioned within the elongated cavity. In this regard, the actuator can effectively fold/unfold the outer wing member relative to the inner wing member without the physical structure of the actuator impeding movement of the outer wing member. This allows the outer wing member to pivot upland to a position against the inner wing member.

Therefore, in accordance with one aspect of the invention, a fertilizer applicator including a frame assembly having a carrier frame and a pair of outer wings pivotally coupled to opposite lateral ends of the carrier frame. The carrier frame is adapted to be coupled to a towing vehicle and the outer wings each have an inner wing portion and an outer wing portion pivotally coupled to the inner wing portion. The inner wing portion includes an inner wing frame member and the outer wing portion includes an outer wing frame member pivotally coupled to the inner wing frame member, and each inner wing frame member includes an elongated hollow portion formed along a length of the inner wing frame member. The fertilizer applicator further includes an actuator assembly having a pair of actuators for folding/unfolding the outer wing members relative to the inner wing members. An actuator is located in each one of the hollow portions of the inner wing frame members, with each actuator having a first end coupled to an inner wing frame member and a second end, opposite the first end, that is coupled to an outer wing frame member and wherein operation of each actuator causes an associated outer wing members to pivot about a pivot connection with an associated inner wing member. The fertilizer applicator further includes a plurality of ground engaging tools mounted to the frame assembly.

In accordance with another aspect of the invention, a farm implement comprises a frame assembly including a carrier frame and a pair of wing frame assemblies mounted to the carrier frame, with each wing frame assembly including first, second, and third outer wing members with the first wing member pivotally coupled to the carrier frame, the second wing member pivotally coupled to the first wing member, and the third wing member pivotally coupled to the second wing member. The farm implement further comprises first and second hydraulic actuators, wherein the first hydraulic actuator is interconnected between the carrier frame and first wing members of a first wing frame assembly and wherein the second hydraulic actuator is interconnected between the first and second wing members of a second wing frame assembly, and wherein each second wing member provides a housing for a respective one of a third hydraulic actuator.

According to yet another aspect of the invention, a fertilizer system includes a tractor and a fertilizer applicator hitched to the tractor. The fertilizer applicator has a seven-section frame assembly with a width of at least sixty feet. The seven-section frame assembly includes a carrier frame coupled to the tractor and configured to support first and second outer wing sections in a folded position in which the first and second outer wing sections are located above the carrier frame, and wherein the carrier frame includes an actuator arrangement for folding and unfolding the first and second outer wing sections. The first and second outer wing sections each include an inner frame member, a middle frame member, and an outer frame member, with the outer frame member pivotally coupled to the middle frame member and configured to pivot upland, i.e., toward the tractor or towing vehicle, about a vertical axis by an actuator when the outer frame member is being pivoted from an extended working position to a folded transport position and wherein the actuator is positioned within an elongated cavity defined by the middle frame member. The fertilizer system further includes a plurality of soil engaging tools mounted to the carrier frame and the first and second outer wing sections.

One aspect of the invention is a foldable fertilizer applicator having a working width of at least sixty feet.

Another aspect of the invention is a fertilizer applicator having a reduced transport height dimension.

Yet a further aspect of the invention is a fertilizer applicator having a front-folding outer wing frame member and an in-frame actuator to fold/unfold the outer wing frame member.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings:

FIG. 7 is a section view of the frame assembly taken along line 7-7 of FIG. 3;

FIG. 8 is a section view of the frame assembly taken along line 8-8 of FIG. 3.

DETAILED DESCRIPTION

Figure 1:
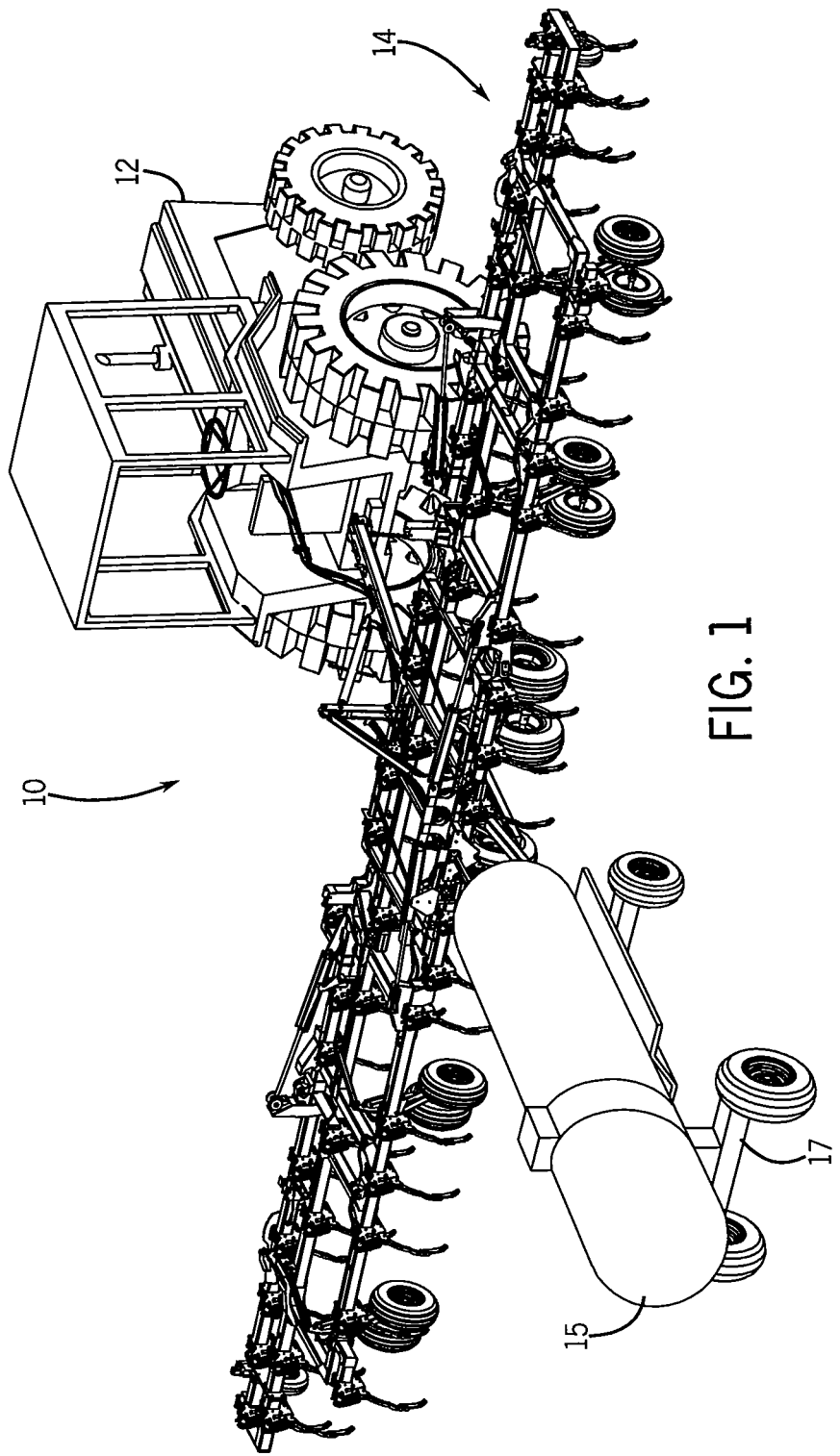
FIG. 1 is a pictorial view of a fertilizing system having a fertilizer applicator incorporating the principles of the present invention.

FIG. 1 shows a fertilizing system 10 having a tractor 12 and a fertilizer applicator 14 coupled to the tractor 12 in a conventional manner so as to be pulled by the tractor 12 along a farm field or roadway. While a tractor 12 is shown, it is understood that other types of towing vehicles could be used to tow the fertilizer applicator. A fertilizer tank 15 is supported by a wheeled cart 17, which is removably coupled to rearward portion of the fertilizer applicator 14, and supplies gaseous fertilizer to the fertilizer applicator 14 for deposition onto ground in a known manner. The fertilizer may be of any known type, such as liquid, gas, or flowable granular.

Figure 2:
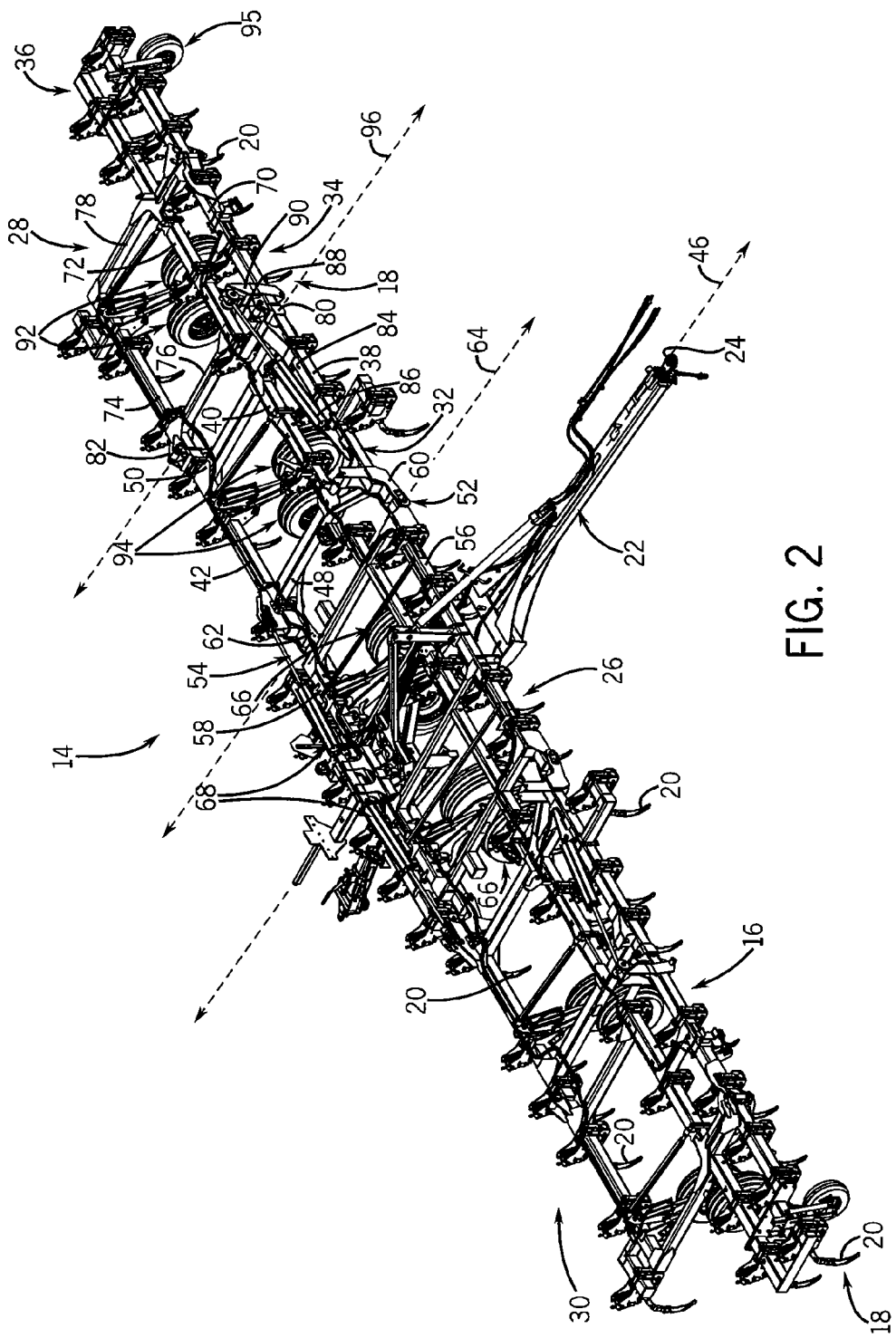
FIG. 2 is an isometric view of a fertilizer applicator according to one embodiment of the invention.
Figure 2A:
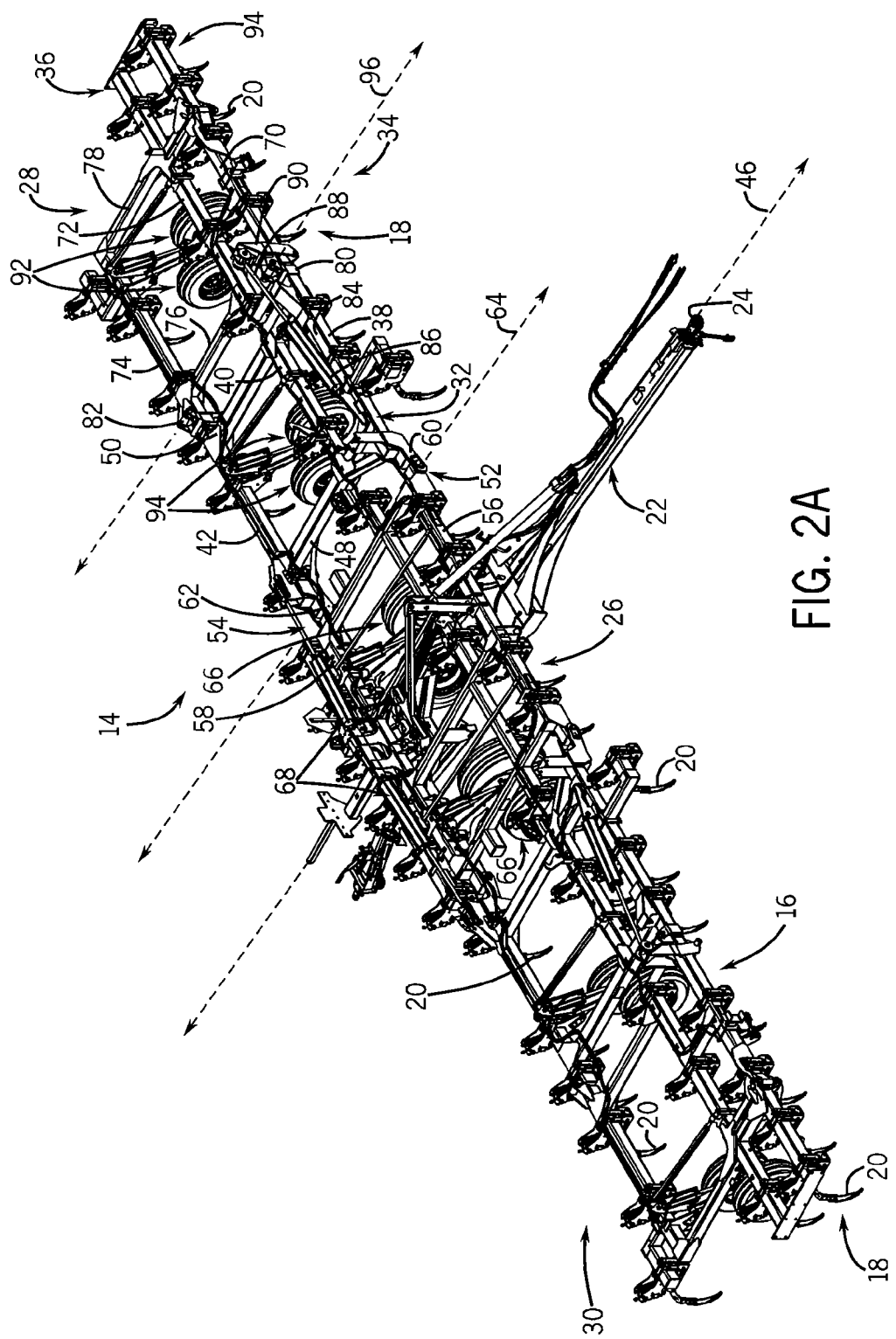
FIG. 2A-2C are isometric views of fertilizer applicators according to other embodiments of the invention.
Figure 2B:
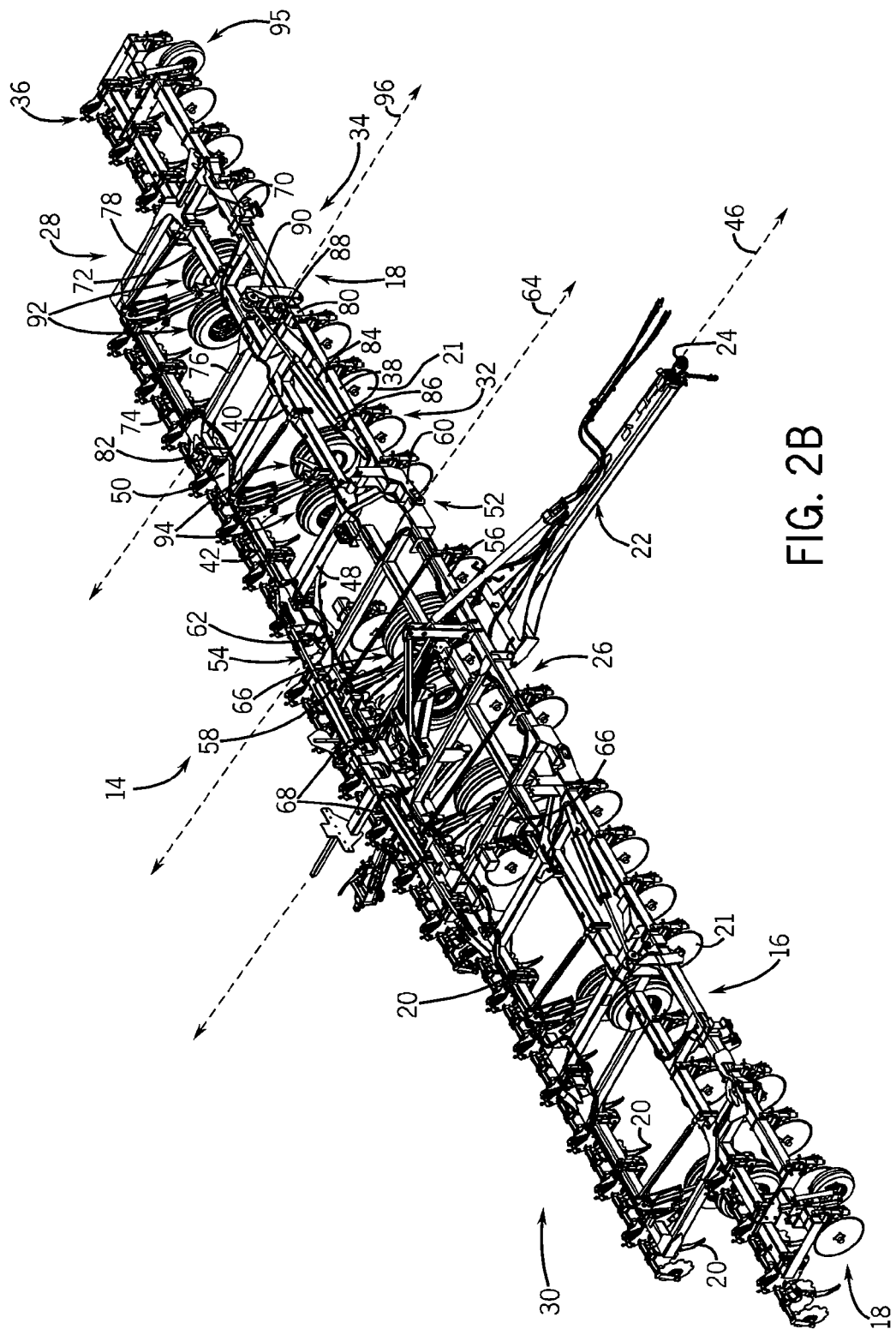
Figure 2C:
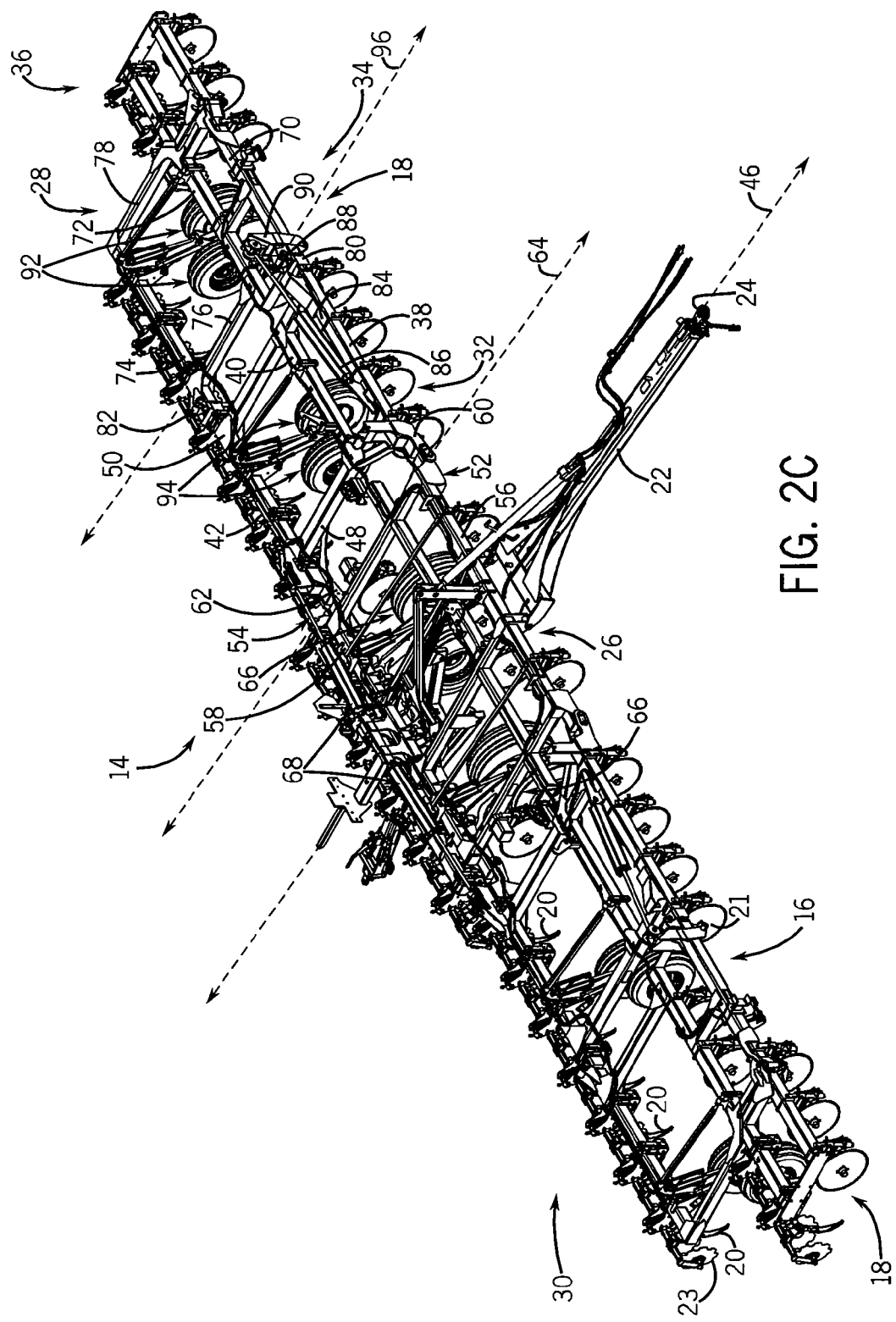

With additional reference to FIG. 2, the fertilizer applicator 14 has a frame assembly 16 to which ground engaging tools 18 are mounted. In the illustrated embodiment, the ground engaging tools 18 include shanks 20 mounted to the frame assembly with fifteen inch row spacing. FIG. 2A shows a fertilizer applicator according to another embodiment of the invention. In this embodiment, the frame assembly 16 is smaller in operational width than the frame assembly shown in FIG. 2 and also has shanks 20 mounted to the frame assembly with fifteen inch row spacing. FIG. 2B shows a fertilizer applicator with a frame assembly similar to the frame assembly illustrated in FIG. 2 but with disc coulters 21 in addition to shanks 20 mounted to the frame assembly. In this illustrated embodiment, the shanks 20 and coulters 21 are mounted with thirty inch row spacing. Sealing discs 23 may also be mounted to the frame assembly. FIG. 2C shows another fertilizer applicator according to the invention. In this embodiment, the frame assembly is similar to that shown in FIG. 2A, but has shanks 20, coulters 21, and sealing discs 23 mounted to the frame assembly. It is understood that different types of ground engaging tools may be mounted to the frame assembly 16 and that the invention is not limited to any particular arrangement. Moreover, as described more fully herein, the operational widths of the frame assemblies may be different that explicitly described and the spacing between ground engaging tools may be different from that described. Thus, in one embodiment, the frame assembly has an operational width of sixty feet or sixty-five feet, but the invention is not so limited.

The frame assembly 16 also includes a tongue 22 having a receiver 24 at its forward end for coupling the frame assembly 16 to the tractor 12. It is understood that the receiver 24 may take one of many forms for hitching the frame assembly 16 to the tractor 12. For example, in one embodiment, the receiver 24 may fit over a ball (not shown) mounted to a rear portion of the chassis of the tractor 12. It should be noted that the frame assembly 16 further supports various hoses and hydraulic connections to support the transfer of fertilizer from the tank 15. The structural features are generally well-known in the art and thus will not be described further herein. Additionally, it is understood that the fertilizer applicator 14 includes means for lowering the frame assembly 16 into a ground engagement position and means for raising the frame assembly 16 from the ground engagement position. Such lifting/lowering means are well-known in the art and thus will not be described further herein. It is further understood that the invention is not limited to any particular lifting/raising means or any particular systems for transferring fertilizer from the tank 15 to nozzles (not shown) mounted to the frame assembly 16.

The frame assembly 16 consists of a center frame section, or carrier frame 26, and a pair of wing sections or "booms" 28, 30 that flank opposite sides of the carrier frame 26. Wing section 28 is mounted to the left side of the carrier frame 26 and wing section 30 is mounted to the right side of the carrier frame (as viewed from a rear of the fertilizer applicator 14 toward the tractor 12). Wing sections 28 and 30 are similarly constructed and, as such, for purposes of description, only wing section 28 will be described further herein, but it is understood that the description of wing section 28 also applies to wing section 30.

Wing section 28 has an inner wing portion 32, a middle wing portion 34, and an outer wing portion 36. The inner wing portion 32 has a forward frame member 38, an intermediate frame member 40, and a rearward frame member 42. Frame members 38, 40, and 42 are arranged parallel to one another and are transverse to a longitudinal axis 46 of the fertilizer applicator 12. End frame members 48 and 50 connect the forward, intermediate, and rearward frame members 38, 40, and 42, respectively, into an integrated unit. The forward frame member 38 and the rearward frame member 42 are each pivotally coupled to the carrier frame 26 at joints 52 and 54, respectively. More particularly, the carrier frame 26 has a forward frame member 56 and a rearward frame member 58 that align with frame members 38 and 42, respectively. An end of forward frame member 38 and an end of the forward frame member 56 are each pinned to a forward linking member 60 and an end of the rearward frame member 42 and an end of the rearward frame member 58 are each pinned to a rearward linking member 62. These pinned connections with the linking members 60, 62 enable the inner wing portion 32 to be rotated upward along a folding axis 64, which is parallel to longitudinal axis 46. The carrier frame 26, which is supported above the ground by a pair of tandem wheels 66, includes a pair of up-folding actuators 68, each of which folds a respective inner wing portion 32, and, as will be explained, the middle wing portion 34 and the outer wing portion 36 to a transport position above the carrier frame 26.

Still referring to FIG. 2, the middle wing portion 34 is similar in construction to the inner wing portion 32 in having a forward frame member 70, an intermediate frame member 72, a rearward frame member 74, and a pair of connecting frame members 76 and 78. The middle wing portion 34 connects to the inner wing portion 32 via a pair of linking members 80 and 82. The connection of the inner wing portion 32 and the middle wing portion 34 allows the middle wing portion 34 to be folded over the inner wing portion 32 via actuator 84. More particularly, the actuator 84 includes a barrel 86 coupled to inner wing portion 32, e.g., forward frame member 38, and a rod 88 connected to the middle wing portion 34. In a preferred embodiment, the rod 88 connects to a bracket 90 coupled to the forward frame member 70 of the middle wing portion 34. As shown in FIG. 2, when rod 88 is (nearly) fully extended, the middle wing portion 34 is unfolded such that the forward frame member 70 is co-aligned with forward frame member 38 of the inner wing portion 32. Additionally, when the rod 88 is fully extended, the weight of the middle wing portion 34 and the outer wing portion 36 has been redistributed so as to load tandem support wheels 92, 94 and outer wheel 95. As shown in FIG. 2, the inner wing portion is also supported by tandem wheels 94 when moved to the lowered (unfolded) position. When the rod 88 is (nearly) fully retracted, the middle wing portion 34 (and the outer wing portion 36 as will be described) is folded vertically about longitudinal axis 96, which is parallel to axes 46 and 64.

Figure 3:
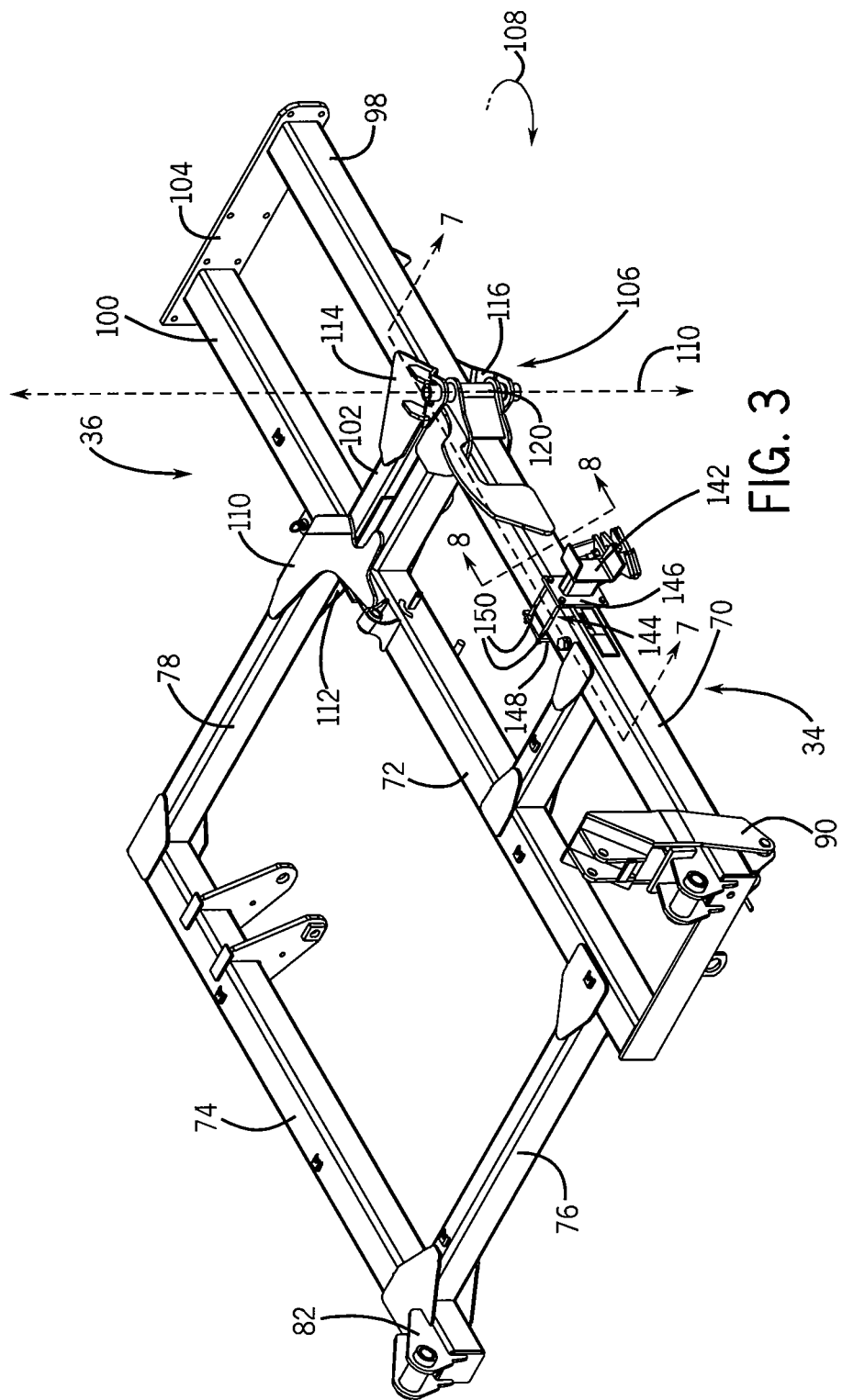
FIG. 3 is an isometric view of a portion of the frame assembly of the fertilizer applicator of FIG. 2, with an outer wing portion of the frame assembly in an unfolded, working position.
Figure 4:
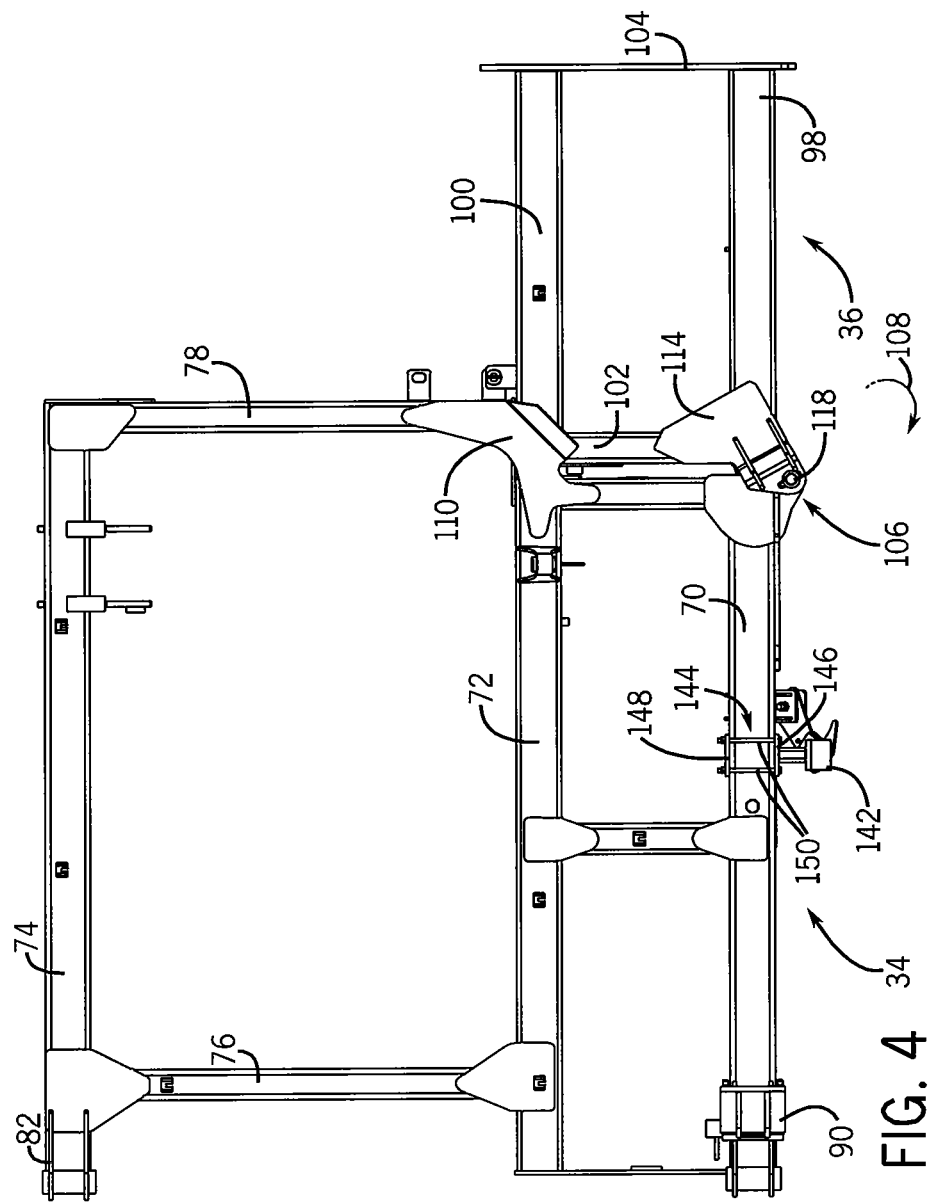
FIG. 4 is a top plan view of the frame assembly shown in FIG. 3.
Figure 5:
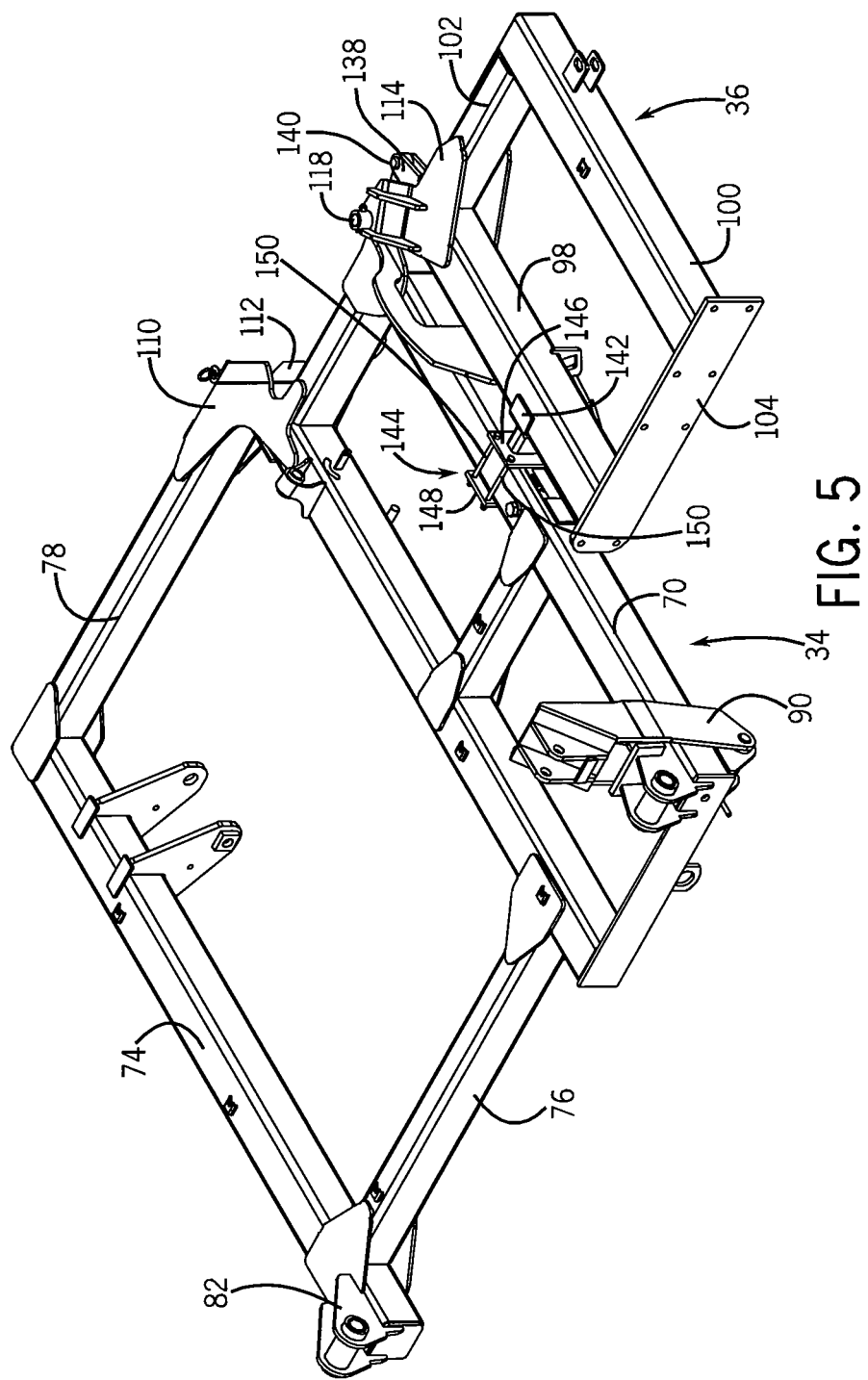
FIG. 5 is an isometric view of the portion of the frame assembly of the fertilizer applicator shown in FIG. 3, with the outer wing portion of the frame assembly in a folded position.
Figure 6:
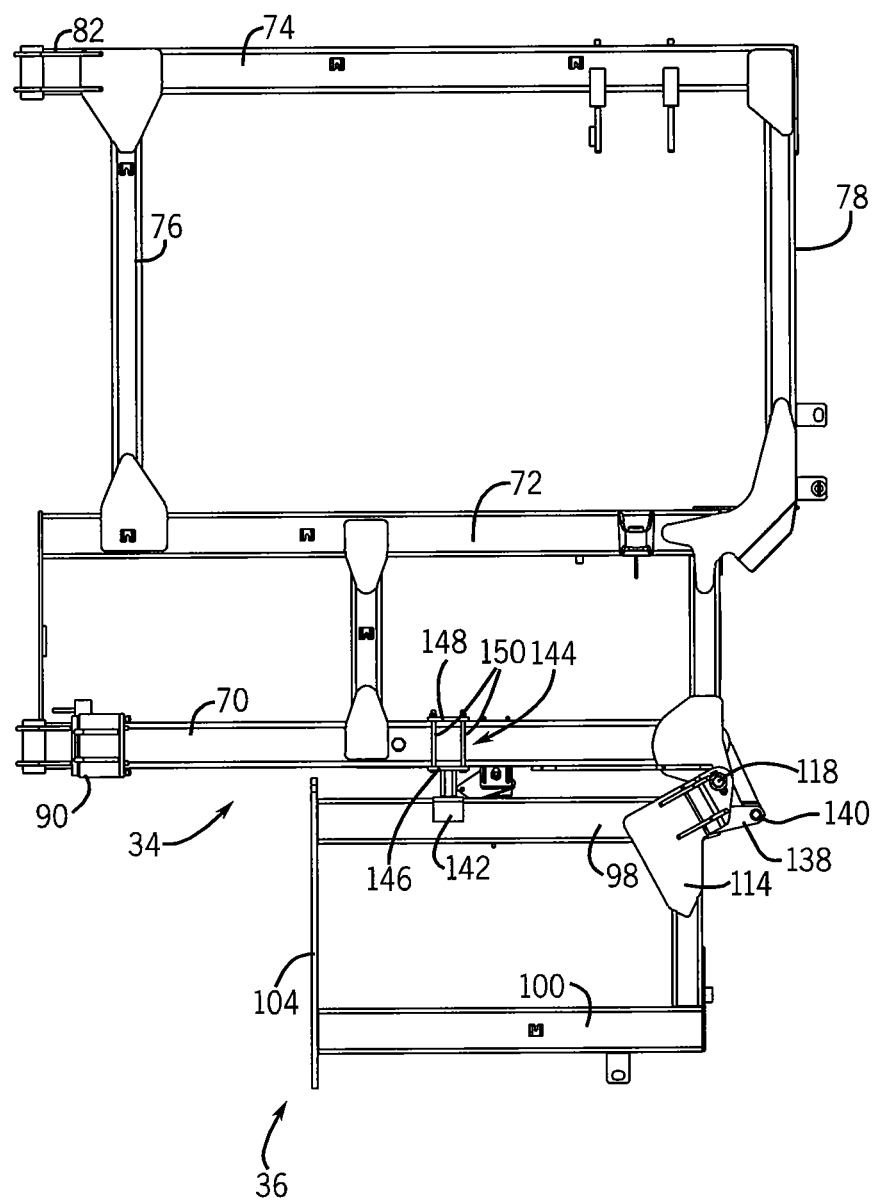
FIG. 6 is top plan view of the frame assembly shown in FIG. 5.

With additional reference to FIGS. 3 and 4, the outer wing portion 36 is somewhat similar to the construction of the inner and middle frame portions 32, 34. The outer wing portion 36 has a forward frame member 98, a rearward frame member 100, and connecting frame members 102 and 104. However, in contrast to the inner and middle wing portions, the outer wing portion preferably does not have an intermediate frame member. In this regard, the rearward frame member 100 preferably aligns with the intermediate frame member 72 of middle wing portion 34. The forward frame member 98 of the outer wing portion 36 is pivotally coupled to the forward frame member 70 of the middle wing portion 34 via a pivot arrangement 106. As will become more apparent from the description below, the pivot arrangement 106 enables the outer wing portion 36 to be folded upland or forward (in the direction of arrow 108) about vertical axis 110 approximately 180 degrees. When fully folded, the outer wing portion 36 is moved forward of a portion of the middle wing portion 34 so that the forward frame member 98 is adjacent the forward frame member 70 of the middle frame portion 34, as shown in FIGS. 5 and 6.

Referring back again to FIGS. 3 and 4, the pivot arrangement 106 is the only connection of the outer wing portion 36 with the middle wing portion 34. The connection of frame members 100 and 102 create a corner (not shown) that is received by a pocket (not numbered) formed by a pair of plates 110 and 112 mounted at the corner of frame members 72 and 78. It will be appreciated that the space or gap (not numbered) formed between the plates 110, 112 is slightly greater than the thickness of the frame members 100 and 102 to allow the shared corner of those members to be slidably received in the pocket formed by the plates 110, 112.

The pivot arrangement 106 includes a pair of mounting plates 114 and 116 mounted to upper and lower surfaces of the forward frame member 98. Each mounting plate 114, 116 has an eyelet (not numbered) that are aligned with one another to receive a pivot pin 118 extending through an upright mounting sleeve 120. The pivot pin 118 includes transverse holes (not numbered) at its upper and lower ends to enable cotter pins or similar fastening devices to secure the pin 118 in sleeve 120 and to prevent the mounting plates 114, 116 from sliding out engagement with the pin and sleeve.

Referring now to FIGS. 5 through 8, forward frame member 70 is an elongated generally tubular member defining an elongated cavity 122 along the entire length of the forward frame member 70. The elongated cavity 122 is sized to house an actuator 124 for pivoting the outer wing portion 36 about pin 118 as described above. Tie rods 126 hold the barrel or cylinder 128 together in a known manner. Alternately, a welded cylinder could be used. The actuator 124 further has a ram 130 that is connected to the outer wing portion 36 via a linkage assembly 132.

The linkage assembly 132 consists of a roller 134 that is connected on one side to the ram 130 and connected to an arm 136 on the opposite side. The arm 136 is connected to a bracket 138 that is secured to the forward frame member 98 of the outer wing portion 36. The arm 136 is connected to the bracket 138 via an upright pivot pin 140 that allows the bracket 138 to swing the outer wing portion 36 around the pivot pin 118 when the ram 130 is being extended/retracted. Accordingly, when the ram 130 is extended, the roller 134 will push laterally outward against bracket 138 thereby causing the bracket to apply a pushing force against the forward frame member 98. The pivot arrangement 106 transfers this linear motion of the ram 130 into rotational movement of the forward frame member 98 around pivot pin 118 until the ram 130 is fully extended and the outer wing portion 36 has reached its folded position, as shown in FIGS. 5 and 6. Retraction of the ram 130 causes a reversal of the aforedescribed motion to unfold the outer wing portion 36.

The placement of the actuator 124 within the frame cavity and behind the forward frame member 70 positions the actuator within the footprint of the forward frame member 70 and thus clear from hindering the outer wing portion from folding generally tight against the middle wing portion. Moreover, since the actuator 124 is in the forward frame member 70 rather than extending laterally outward from the forward frame member 70, the separation between the outer wing portion and the middle wing portion is relatively small. As a result, the fore-aft length of the frame assembly when folded is reduced.

As best shown in FIGS. 3-6, receiver 142 is mounted to a front side of the forward frame member 70. The receiver 142 is secured to the forward frame member 70 by a mounting bracket 144, which in the illustrated embodiment, is a clamp-type bracket having a pair of plates 146, 148 held against the forward frame member 70 by bolts 150. The receiver 142 is designed to help hold the outer wing portion 36 in place when in the folded position, as shown in FIGS. 5 and 6, and thereby prevent swaying of the outer wing portion 36 when the fertilizer applicator 14 is being moved to, or is in, the folded position.

Figure 9:
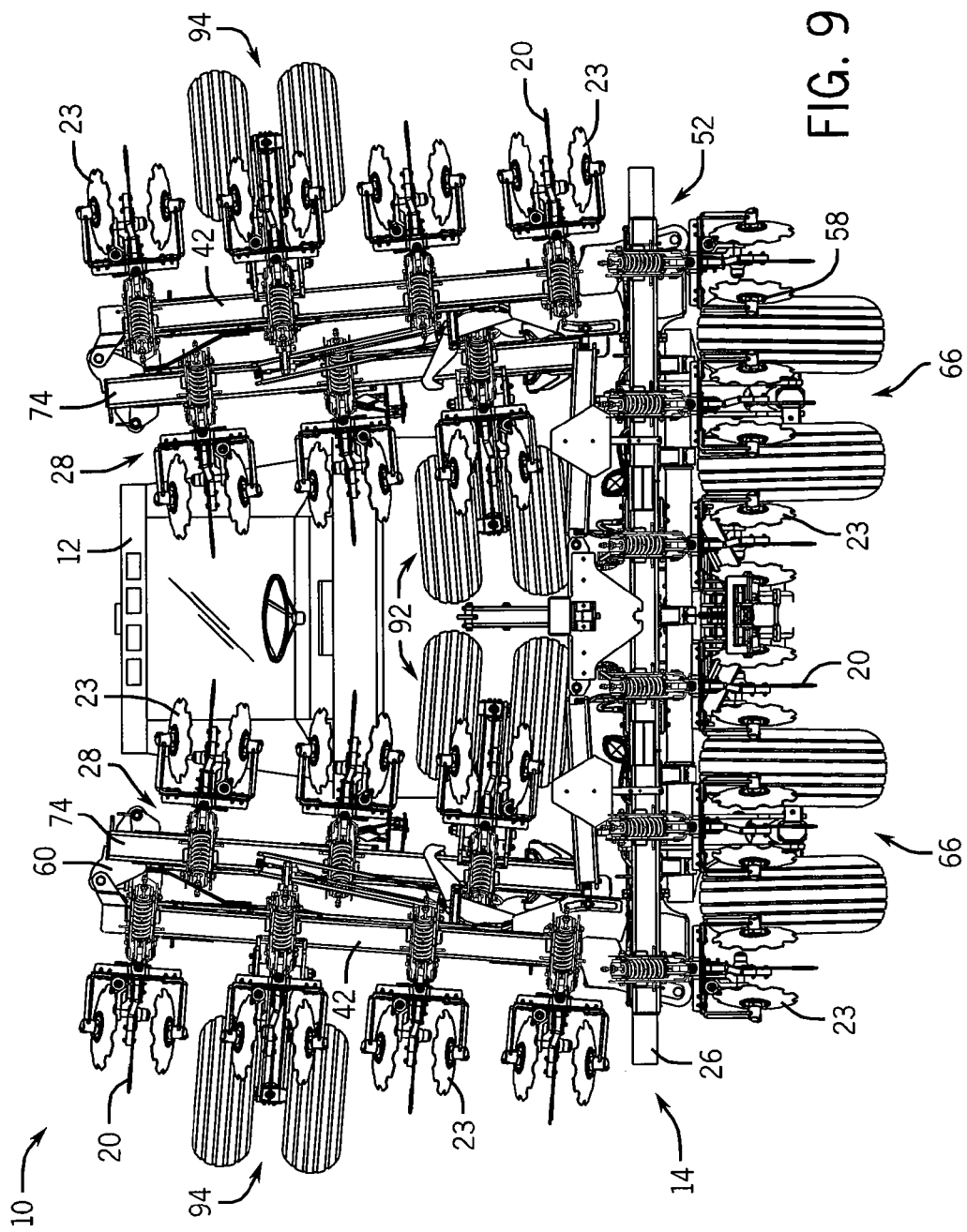
FIG. 9 is a rear elevation view of the fertilizer applicator of FIG. 2 in a folded transport position.

FIG. 9 shows the fertilizer applicator 14 in the folded position. In the folded position, the outer wing portions are folded forward as described above to be adjacent a front side of the middle wing portions. The middle wing portions are then folded over the inner wing portions to provide a pre-transport stacked arrangement of the wing booms. In a final step, the inner wing portions are folded vertically so that the inner wing portions are generally perpendicular to the ground. In this position, the wing booms are carried above the carrier frame 26 and the weight of the folded wing booms is supported by the carrier frame 26 and the transport tandem wheels 66. In a preferred embodiment, when folded, the fertilizer applicator has a width of less than twenty feet, e.g., 18 feet, 9 inches. This transport width meets the demands for in-field movement, passing through gates or storage/barn doors, and for being towed along roadways. Moreover, the fertilizer applicator 14 is capable of meeting this transport parameter despite having a working width greater than fifty feet, e.g., sixty feet or sixty-five feet.

In one embodiment of the invention, the fertilizer applicator has an operational width of sixty feet, a transport height of approximately fourteen feet, and a transport width of approximately nineteen feet. In this embodiment of the invention, the fertilizer applicator further has four walking tandem transport wheels and eight walking tandem wheels that support together with the transport wheels support the fertilizer applicator when in the working position. The fertilizer applicator further has a gross weight of 22,500 pounds and an operating speed between five to eight miles per hour.

In another embodiment, the fertilizer applicator has an operation width of sixty-five feet and a gross weight of 23,000 pounds. The working speed, transport width, transport height, and tandem wheels similar to that described above with respect to the sixty foot fertilizer applicator.

The present invention has been described with respect to a fertilizer applicator but it is understood that the invention may be incorporated with other types of farm implements, including, for example, planters, seeders, drills, and the like. Moreover, the invention may be incorporated with farm implements that are towed by a tractor, such as that described herein, as well as implements that are mounted to a vehicle frame, such as a Case New Holland Titan Series floater and a Case New Holland Patriot Series sprayer.

Many changes and modifications could be made to the invention without departing from the spirit thereof. The scope of these changes will become apparent from the appended claims.

We claim:

1. A fertilizer applicator comprising:
   a frame assembly having a carrier frame and a pair of outer wings pivotally coupled to opposite lateral ends of the carrier frame, the carrier frame adapted to be coupled to a towing vehicle and the outer wings each having an inner wing portion pivotably coupled to the carrier frame, an intermediate wing portion pivotably coupled to the inner wing portion and an outer wing portion pivotally coupled to the intermediate wing portion, and wherein the intermediate wing portion includes an intermediate wing frame member and the outer wing portion includes an outer wing frame member pivotally coupled to the intermediate wing frame member, and wherein each intermediate wing frame member includes an elongated hollow portion formed along a length of the intermediate wing frame member;
   an actuator assembly that includes a pair of actuators for folding/unfolding the outer wing frame members relative to the intermediate wing frame members, an actuator located in each one of the hollow portions of the intermediate wing frame members, wherein each actuator has a first end coupled to an intermediate wing frame member and a second end, opposite the first end, that is coupled to an outer wing frame member and wherein operation of each actuator causes an associated outer wing frame members to pivot about a pivot connection with an associated intermediate wing frame member;
   a plurality of ground engaging tools mounted to the frame assembly; and
   a pair of fold-up actuators for folding/unfolding the inner wing portions relative to the carrier frame.

2. The fertilizer applicator of claim 1 wherein the pair of actuators includes first and second hydraulic actuators, each hydraulic actuator having a barrel and a retractable/extendable ram.

3. The fertilizer applicator of claim 2 wherein each barrel is coupled to a respective intermediate wing frame member and each retractable/extendable ram is coupled to a respective outer wing frame member.

4. The fertilizer applicator of claim 1 wherein each actuator enables approximately 180 degrees rotation of a respective outer wing frame member relative to an associated intermediate wing frame member.

5. The fertilizer applicator of claim 1 wherein the plurality of ground engaging tools includes ground engaging tools mounted to the carrier frame, the inner wing portion, the intermediate wing frame members, and the outer wing frame members, and wherein the ground engaging tools are mounted to extend rearward of a portion of the frame assembly to which the ground engaging tools are mounted.

6. The fertilizer applicator of claim 1 further comprising a receiver mounted to an upland surface of the intermediate wing frame members, and wherein the outer wing frame members are adapted to be seated in a respective receiver when pivoted to a fully folded position.

7. The fertilizer applicator of claim 1 wherein the plurality of ground engaging tools include at least one of disc coulters, shanks, and sealers.

8. The fertilizer applicator of claim 1 wherein the frame assembly has a maximum width of at least sixty feet.

9. The fertilizer applicator of claim 1 further comprising a tank mounting structure extending from a rearward portion of the carrier frame and adapted to enable hitching of fertilizer tank to the carrier frame.

10. A farm implement comprising:
    a frame assembly including a carrier frame and a pair of wing frame assemblies mounted to the carrier frame, each wing frame assembly including first, second, and third wing members with the first wing member pivotally coupled to the carrier frame, the second wing member pivotally coupled to the first wing member, and the third wing member pivotally coupled to the second wing member; and
    first and second hydraulic actuator assemblies, wherein the first hydraulic actuator assembly is interconnected between the carrier frame and first wing members of the wing frame assemblies and wherein the second hydraulic actuator assembly is interconnected between the first and second wing members of the wing frame assemblies, and wherein each second wing member provides a housing for a respective one of a third hydraulic actuator;

wherein the first hydraulic actuator assembly fold/unfold the first wing members of the wing frame assemblies relative to the carrier frame.

11. The farm implement of claim 10 wherein each second wing member includes a tubular member having an upland surface and a cavity opposite the upland surface, and wherein the third hydraulic actuator is located within a respective cavity of the second wing members.

12. The farm implement of claim 11 wherein each third hydraulic actuator includes a barrel and an extendable/retractable ram operable to pivot a third wing member relative to a second wing member.

13. The farm implement of claim 12 wherein each ram has a range of motion that enables 180 degrees of rotation of the third wing member relative to the second wing member.

14. The farm implement of claim 10 further comprising an arrangement of ground engaging tools mounted to the frame assembly, wherein the ground engaging tools include shanks, coulters, and sealers.

15. A fertilizing system comprising:
a tractor; and
a fertilizer applicator having a seven-section frame assembly with a width of at least sixty feet, the seven-section frame assembly including a carrier frame coupled to the tractor and configured to support first and second outer wing sections in a folded position in which the first and second outer wing sections are located above the carrier frame, and wherein the carrier frame includes an actuator arrangement for folding and unfolding the first and second outer wing sections;

wherein the first and second outer wing sections each include an inner frame member, a middle frame member, and an outer frame member, the outer frame member pivotally coupled to the middle frame member and configured to pivot upland about a vertical axis by an actuator when the outer frame member is being pivoted from an extended working position to a folded transport position and wherein the actuator is positioned within an elongated cavity defined by the middle frame member; and a plurality of soil engaging tools mounted to the carrier frame and the first and second outer wing sections;

wherein each of the inner frame members is interconnected to the carrier frame by a corresponding actuator of the actuator arrangement, the actuators folding/unfolding each inner frame member relative to the carrier frame.

16. The fertilizing system of claim 15 further comprising a cart mounted to a rear portion of the carrier frame and a tank for holding fertilizer positioned on the cart.

17. The fertilizing system of claim 15 wherein the seven-section frame assembly has a width of at least sixty-five feet.

18. The fertilizing system of claim 15 further comprising a folding actuator interconnected between each inner frame member and each middle frame member, wherein the folding actuator is operative to fold the outer frame member and middle frame member as a single unit over the inner frame member.

19. The fertilizing system of claim 15 wherein the fertilizer applicator has a working speed between five and eight miles per hour.

* * * * *